United States Patent [19]

Pokhis

[11] Patent Number: 5,356,161
[45] Date of Patent: Oct. 18, 1994

[54] CARRIAGE

[76] Inventor: Naum Pokhis, 1132 S. Doheny Dr., Apt. 303, Los Angeles, Calif. 90035

[21] Appl. No.: 136,824

[22] Filed: Oct. 18, 1993

[51] Int. Cl.$^5$ ............................................. B62B 3/02
[52] U.S. Cl. .......................... 280/33.991; 280/33.993; 280/33.996
[58] Field of Search ...................... 280/33.991, 33.995, 280/651, 33.996, 657, 33.997, 659, 30, 47.35, 47.34, 47.41, 33.992, 33.993

[56] References Cited

U.S. PATENT DOCUMENTS 2,662,661 12/1953 Goldman ..................... 280/33.991
3,375,018 3/1968 Close ............................. 280/33.991
3,645,554 2/1972 Von Stein et al. ............. 280/33.991

Primary Examiner—Richard M. Camby
Attorney, Agent, or Firm—I. Zborovsky

[57] ABSTRACT

In a movable carriage having upright walls the bottom is pivotally connected with the walls and has two bottom portions pivotally connected with one another, so that in a horizontal position the bottom can support goods, in a completely upright position a user can walk inside the carriage, and in a position in which one bottom portion is placed on another bottom portion a seat is formed and a user can sit in the carriage.

7 Claims, 2 Drawing Sheets

CARRIAGE

BACKGROUND OF THE INVENTION

The present invention relates generally to carriages.

Shopping carriages are well known and used for shopping of goods. Carriages are also known in which people having problems with walking can move inside and outside. However, there were no devices which can be used for both purposes. Also existing carriages of the second type have disadvantages that their walls are composed of pipes and the user can fall and be hurt by the pipes. It is believed that it is desirable to provide carriages which avoids the disadvantages of the prior art.

SUMMARY OF THE INVENTION

Accordingly, it is an object of the present invention to provide a carriage which avoids the disadvantages of the prior art.

In keeping with these objects and with others which will become apparent hereinafter, one feature of the present invention resides, briefly stated, in a carriage in which its bottom is pivotally connected to a wall and has two portions turnably connected with one another, so that when the bottom is turned to its upright position a user can stand inside the carriage and move, when one bottom part extends horizontally and another bottom part is placed on it a seat is formed and a user can be inside the carriage and sit on the seat, and when the bottom as a whole extends horizontally goods can be placed on it.

When the carriage is designed in accordance with the present invention, it avoids the disadvantages of the prior art and performs both the function of the shopping card and walking-assisting carriage.

The novel features of the present invention are set forth in particular in the appended claims.

The invention itself, however, both as to its construction and its manner of operation will be best understood from the following description of preferred embodiments which is accompanied by the following drawings.

DESCRIPTION OF PREFERRED EMBODIMENTS

Figure 6:
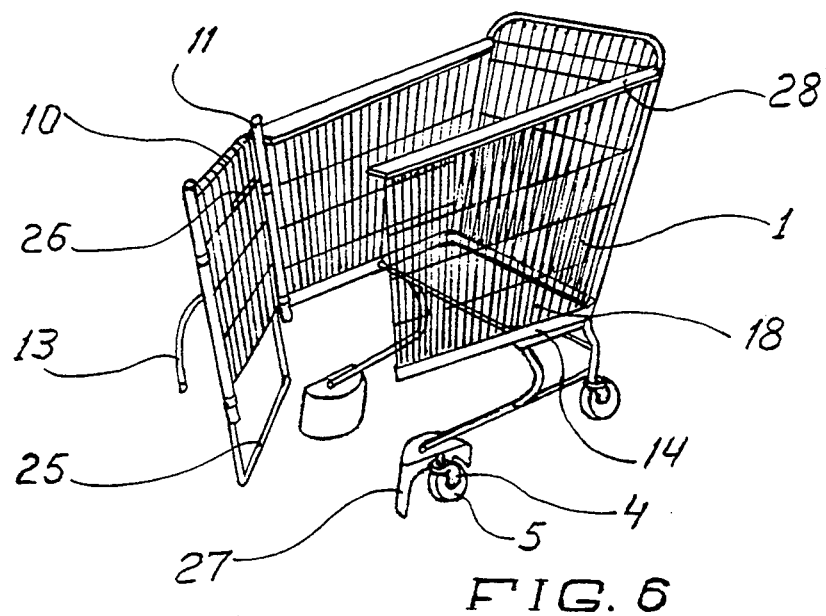
FIG. 6 is a perspective view of the inventive carriage.

A carriage is identified as a whole with reference numeral 1. A conventional lower net of the carriage is removed and a front part of a lower frame is removed as well. The wheels 5 are mounted pivotally and symmetrically at an outer side of the lower frame. The front upright wall lo is arranged on a hinge 11 relative to other walls, and all ways are formed by nets so that if user falls it cannot be injured. The front wall 10 is provided with a releasable lock.

The carriage has a three-sided frame 14 with two curved reinforcing members 15. A bottom 18 composed of a front bottom portion 19 and a rear bottom portion 20 is mounted on the frame and connected with the latter by a hinge 22. The bottom portions 19 and 20 are connected with one another by a hinge 21. A leg support 26 is mounted on the front wall 10 by clamps 26. In order to protect user's legs from colliding with the wheels 5 when the user walks inside the carriage, protective hoods are arranged above the wheels as identified with 27. Handrails 28 are provided on the side walls for supporting the user's arms and pushing the carriage.

Figure 1:
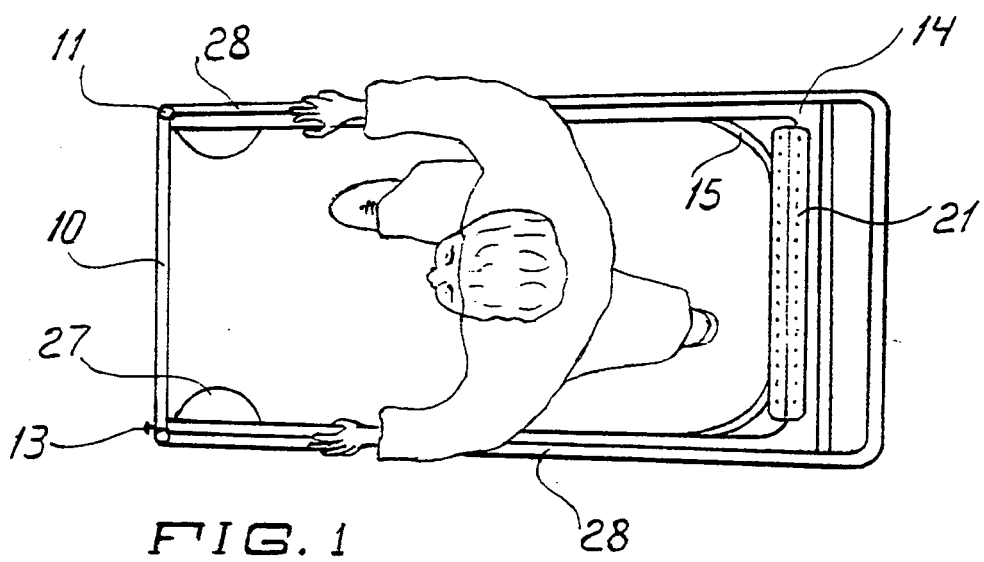
FIG. 1 is a view showing a carriage with a user pushing the carriage and walking inside it.
Figure 2:
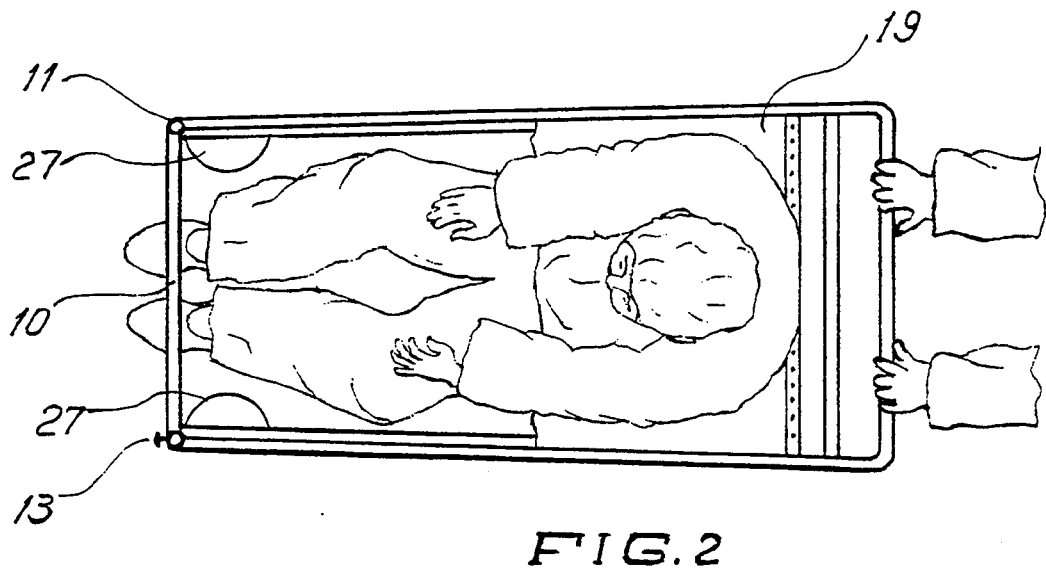
FIG. 2 is a view showing the carriage when the user moves with the assistance of another person.
Figure 3:
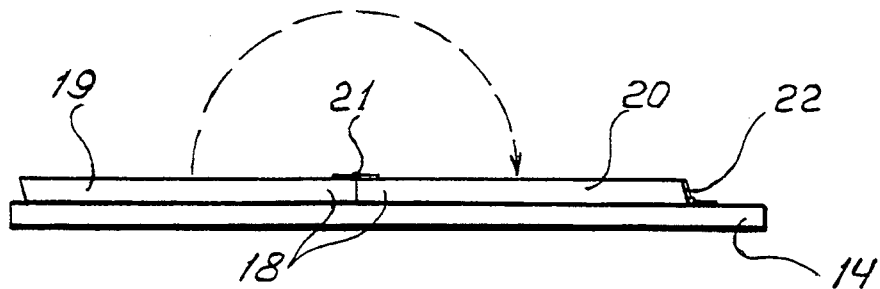
FIG. 3 is a view of a carriage with a closed bottom for shopping purpose.
Figure 4:
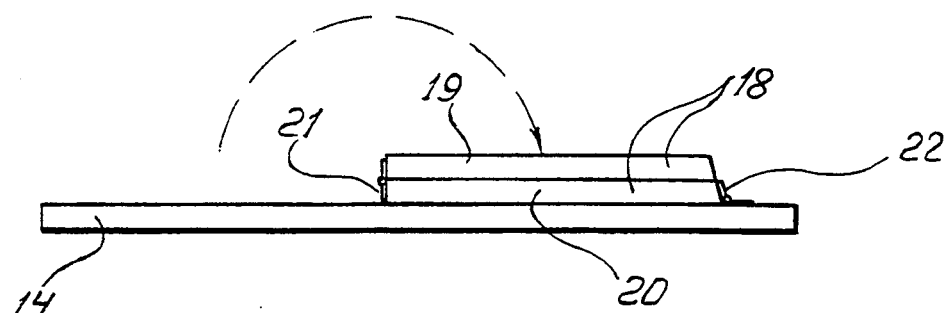
FIG. 4 is a view showing the carriage when a user sits in the carriage and is moved by another person.
Figure 5:
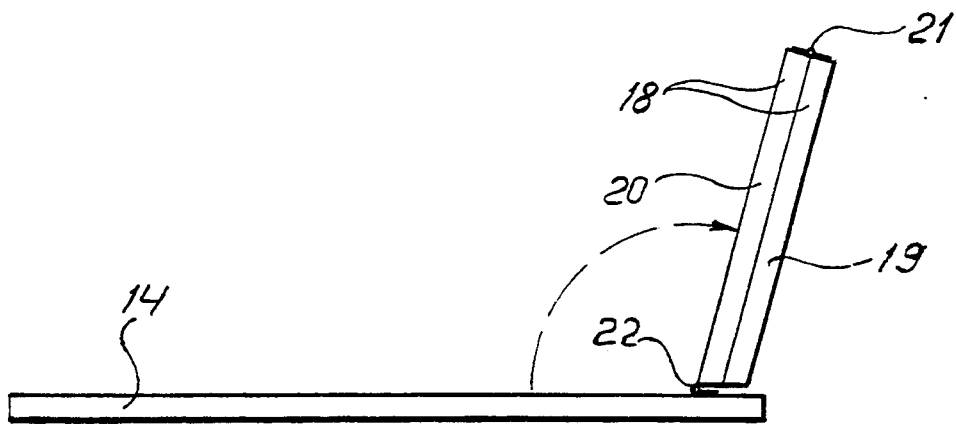
FIG. 5 is a view showing the carriage when the user walks inside it and is supported on handrails.

When the carriage is to be used as a shopping cart, the bottom 18 with its portions 19 and 20 extends as a whole horizontally as shown in FIG. 3. For waking in the carriage, the portions 19 and 20 are placed over one another and the bottom is pivoted from the frame to its substantially upright position as shown in FIG. 5, the whole are between the upright walls is released and the user can walk inside the carriage as shown in FIG. 1. When a user wants to sit in the carriage to be pushed by another person as shown in FIG. 2, the portion 19 is placed on the portion 20 to form a seat, as shown in FIG. 4.

The present invention is not limited to the details shown since various modifications and structural changes are possible without departing in any way from the spirit of the invention.

What is desired to be protected by Letters Patent is set forth inparticular in the appended claims.

I claim:

1. A carriage, comprising a plurality of substantially upright walls; a bottom pivotally connected to at least one of said walls and having at least two bottom portions which are pivotally connected with one another, so that in one position said bottom extends as a whole substantially horizontally between said walls to form an uninterrupted supporting surface for supporting goods, etc, in another position said bottom as a whole is pivoted from a horizontal position to a substantially upright position and a whole space between the walls is released so that a user can stand inside the carriage between said walls, and a further position in which one of said bottom portions extends substantially horizontally while another of said bottom portions is pivoted and placed on top of said one bottom portion and therefore one part of the space between the walls is released for legs of the user while in another part of the space said bottom portions together form a seat for the user; and front and rear wheels for moving the carriage.

2. A carriage as defined in claim 1, wherein at least one of said walls is pivotable relative to other of said walls so as to provide an entrance for a user when said one walls is pivoted away from said other walls.

3. A carriage as defined in claim 1, wherein said one wall is provided with an element for supporting user's legs when the user sits in said further position of said bottom on said bottom portions.

4. A carriage as defined in claim 1; and further comprising means for covering at least said front wheels from above to prevent their colliding with the user's legs.

5. A carriage as defined in claim 2; and further comprising means for releasably locking said one wall with said other walls when said one wall is located close to said other walls and closes said entrance.

6. A carriage as defined in claim 1; and further comprising hinge means for pivotally connecting said bottom to at least one of said walls, and further hinge means for pivotally connecting said bottom portions with one another.

7. A carriage as defined in claim 1, wherein said walls are formed by nets.

* * * * *